UNITED STATES PATENT OFFICE 2,570,180

FLUORINATED POLYAMIDES

Arthur L. Allewelt, West Chester, Pa., assignor to American Viscose Corporation, Wilmington, Del., a corporation of Delaware No Drawing. Application December 6, 1946, Serial No. 714,661

13 Claims. (Cl. 260—78)

This invention relates to new fluorine-containing polyamides, compositions and fibers comprising the same, and methods for producing the polyamides.

It is known that valuable polyamides, some of which are fiber-forming, can be obtained by the condensation of dicarboxylic acids and diamines.

I have now found that very valuable long chain linear polyamides having distinctive properties, and the fundamental repeating structural unit of which is represented by the formula:

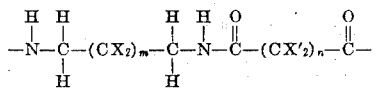

when $m$ is an integer from 0 to 4, inclusive, $n$ is an integer from 1 to 5 inclusive, when $m$ is zero, X' being fluorine, and when $m$ is other than zero, X and X' being selected from the group consisting of hydrogen and fluorine at least one of X and X' being fluorine, may be obtained by condensing derivatives of dicarboxylic acids of the general formula:

where X' is hydrogen or fluorine, Y is a member of the groups COCl and COOR, R being a lower alkyl radical, and $n$ is an integer from one to five, inclusive, with diamines of the formula

where $m$ is an integer from 0 to 4, inclusive, and when $m$ is other than zero, X is hydrogen or fluorine, X being fluorine in either the diacid derivative or the diamine or in both.

The copolymers are obtainable in a wide range of molecular weights, depending upon the particular monomers present in the starting mixture, and, apparently, upon the relative acidity of one monomer and the relative basicity of the other. Thus, if a strongly acidic perfluoro-dicarboxylic acid derivative, such as diethyl octafluoro-adipate or octafluoro-adipyl chloride, and the weakly basic diamine, octafluoro-1,6-hexane diamine are heated to temperatures of from 80–100° C. in a sealed vessel for relatively prolonged periods ranging from 10 to 24 hours or more, polyamides of comparatively low molecular weight, i. e., molecular weights considerably below 10,000 are obtained in a form ranging from solid to wax-like masses. These polyamides cannot be transformed to high polyamides or superpolyamides by continued heating. When strongly acidic derivatives of the non-fluorinated dicarboxylic acids, such as adipyl chloride are heated with the weakly basic octafluoro-1,6-hexane diamine to temperatures of from 80–100° C., polyamides are obtained which have higher molecular weights than those obtained by condensation of the fluorine-containing acid derivatives and the fluorinated diamine, but which are still below 10,000. If, however, the strongly acidic esters or acyl chlorides derived from the perfluoro-dicarboxylic acids and the strongly basic hexamethylene diamine itself are heated in a sealed vessel at a temperature of 100–125° C. for 1-2 hours, low molecular weight polyamides are obtained which, after removal of any volatile by-products formed in the reaction, may be subjected to conditions which favor further reaction, i. e., the polyamides may be heated at temperatures in the neighborhood of 200° or above for comparatively long periods to produce polyamides of high molecular weight, i. e., a molecular weight of 10,000 or higher. These high polyamides or superpolyamides occur as opaque, light-colored, tough masses which have high melting points below decomposition temperatures. When these masses are heated to temperatures of from 200–215° C., they melt to form molten masses having the capacity to be drawn out into fibers which are pliable and strong and show evidence of a high degree of orientation along the fiber axis. Continuous filaments resembling silk may be obtained very readily from a molten specimen of the fluorine-containing high polyamides. The filaments are capable of being cold-drawn, that is, they may be subjected to stretching at ordinary or slightly elevated temperatures, whereby their physical properties are changed to a pronounced extent. The cold-drawn filaments show increased strength, are more pliable, and have higher melting points than the filaments from which they are drawn. Fibers may be obtained by spinning the fluorinated polyamides directly in the molten state. All of the fluorinated polyamides have been found to be insoluble in the common organic solvents, such as alcohols, acetone, the nitroparaffins, acetronitrile, etc., but are soluble in hot dimethyl formamide, which appears to be a specific solvent for the polyamides. Fibers can be obtained from solutions of the high molecular weight fluorine-containing polyamides of the invention by spinning a solution of the polyamide in dimethyl formamide into a non-solvent bath, such as a bath consisting of lower aliphatic alcohols, for example, isopropanol, in accordance with wet-spinning technique. Fibers may also be obtained by the dry-spinning method, by spinning the dimethyl formamide solution of the polyamide into an evaporative atmosphere which may be air or any other gaseous fluid inert to the fibers.

The presence of fluorine atoms in one or both of the monomeric substances apparently profoundly affects the capacity of the monomers to yield polyamides, when subjected to condensation conditions. Although, when a mixture of the dicarboxylic acid per se, such as adipic acid, and a diamine, such as hexamethylene diamine, is subjected to condensation conditions, no difficulty is experienced in obtaining useful polyamides, experience has been otherwise in the case where one or both of the monomers is fluorinated. It has not been found possible to obtain the polyamides from the perfluoro-dicarboxylic acids per se with either the diamines or their fluorine-containing derivatives under the conditions described herein, or by modification of the conditions, such as modification of the temperatures employed, modification of the relative proportions of the monomers in the starting mixtures, etc. The reason for the failure to obtain polyamides by reaction of the perfluorodicarboxylic acids per se with either the diamines or their fluorine-containing derivatives under the conditions described herein, or by modification of the conditions, such as modification of the temperatures employed, modification of the relative proportions of the monomers in the starting mixtures, etc. is not entirely clear, but apparently the melting point for the ammonium salt of the acid which is formed initially in the reaction, and from which, theoretically, the amide should be formed, with elimination of water, on continued heating, is above the decomposition temperature for the polyamide. Although the ammonium salt produced as an initial product of the reaction between, say, octafluoro-adipic acid and hexamethylene diamine, may be melted, and some slight amounts of water may be eliminated, the melting is followed immediately by decomposition, indicating that at temperatures slightly above the melting point of the salt any polyamide formed is unstable.

The fluorinated polyamides of the invention are useful for numerous purposes. The high molecular weight fluorine-containing polyamides obtainable by the interaction of esters or acyl chlorides derived from the perfluorinated dicarboxylic acids and hexamethylene diamine are particularly valuable because of their fiber-forming properties. The fluorine-containing fibers compare favorably in tenacity with fibers comprising polyamides from diamines and dicarboxylic acids per se, but are distinguished therefrom by certain special inherent characteristics. Thus, fibers formed from the new fluorine-containing polyamides have a comparatively high moisture-absorbing and retaining capacity, i. e., the capacity to absorb and retain water in an amount in excess of about 4% on the weight of the fibers, which presents the possibility of obtaining improved dyeings from aqueous media without necessitating the use of special swelling agents or dyeing assistants, or from baths containing only reduced amounts of such assistants. The fibers are relatively inelastic, and do not tend to creep or flow under constant load, particularly at higher temperatures, as do the fibers comprising polyamides formed by the interaction of diamines and non-fluorine-containing dicarboxylic acids per se. The fibers are distinguished, also, by distinctive surface characteristics chiefly evidenced by freedom from clamminess to the touch and a full, somewhat waxy "hand" or "feel" which facilitates their passage through textile working machines. Although these new fibers are useful for any of the uses to which such fibers are ordinarily put, by virtue of their inherent properties and chemical constitution they are naturally adjusted to particular uses for which fibers of other types are not adapted, or for which such other fibers have to be prepared by extraneous conditioning treatments. Thus, due to their increased density, the new fibers are especially well suited to the manufacture of heavy fabrics, and because they are inherently flame-proof and do not flare or support combustion upon direct exposure to a flame, the fibers are peculiarly well adapted, without further conditioning treatment, to the manufacture of fabrics which may be subjected to fire hazard.

The fluorinated dicarboxylic acids may be prepared by controlled fluorination of perchlorocycloalkenes to effect fluorination on all nuclear carbons except the double-bonded carbons, separating the 1,2-dichlorofluorocycloalkene, and oxidizing the alkene to the corresponding perfluoro-dicarboxylic acid. The diesters and dichlorides of the acids, and the diamines, may be prepared by usual methods. Thus, the diesters may be obtained by reacting upon the selected perfluoro-dicarboxylic acid with the selected alcohol, in the presence of a suitable catalyst.

The acyl chlorides of the perfluoro-dicarboxylic acids may be obtained by the action of a clorinating agent, e. g., phosphorous trichloride, on the selected perfluoro acid.

Diamines of the perfluoro-dicarboxylic acids may be prepared by reacting a diester of the selected perfluoro-dicarboxylic acid with anhydrous gaseous ammonia to form the diamide of the acid, converting the diamide to the corresponding nitrile, reacting the nitrile with an acyl anhydride, in the presence of a catalyst and in an atmosphere of hydrogen to obtain the diacyl derivative of the diamine of which the hydrogens attached to all of the carbons except the terminal carbons vicinal to the NH— groups are substituted by fluorine, forming a salt, for example, a sulfate, of the diacylated diamine, and recovering the free diamine from the sulfate or the like.

The following examples are illustrative of the invention. All temperatures are in centigrade.

*Example I*

A mixture of chemically equivalent parts of diethyl octafluoroadipate and hexamethylene diamine was heated in a closed vessel for 1½ to 2 hours at 110–140°. A white mass comprising polymeric hexamethylene octafluoroadipamide was obtained. The vessel was opened and heating was continued at 80°–100° to remove the major portion of the alcohol formed as by-product. The polymeric material was then heated in a dry, deoxygenated nitrogen atmosphere for 3–5 hours at 210°, after which the pressure in the vessel was reduced to 1–2 mm./Hg and heating was continued at that pressure for 10–15 hours at 205–215°. The resulting high polyamide was an opaque, slightly colored solid mass, which was insoluble in most of the common organic solvents, but soluble in hot dimethyl formamide. The polyamide melted at 210–215°. When the molten polymer was touched with a rod, and the rod was drawn away, a continuous filament resembling silk was produced.

Example II

Chemically equivalent amounts of hexamethylene diamine and diethyl hexafluoroglutarate were heated in a closed glass vessel at 100–120° for 1–2 hours. A solid white polymeric material of low molecular weight was obtained. The vessel was opened and heating continued for ½ hour, to remove the major portion of the alcohol formed as by-product in the reaction. The polyamide was then heated at 180–185° under a vacuum of 1–2 mm./Hg in a dry, deoxygenated nitrogen atmosphere. Polymeric hexamethylene hexafluoroglutaramide was obtained in quantitative yield, as a hard, opaque amber to light brown colored solid having a melting point of 183–185°. A continuous filament could be drawn from the molten polymer. The filaments had the capacity to be cold-drawn, and were permanently elongated by from 200 to 700% of their original length by drawing at ordinary temperatures. The polyamide was insoluble in the common organic solvents but was soluble in hot dimethyl formamide.

Example III

A mixture of chemically equivalent parts of freshly distilled 2,2,3,3,4,4,5,5, octafluoro-1,6-hexanediamine and diethyl octafluoroadipate was heated at 100–120° for 10 hours in a sealed glass vessel. The vessel was opened and heating continued at 80–100° for one hour to remove the by-product alcohol. The polyamide occurred as a white mass which was insoluble in the common organic solvents but which dissolved readily in hot dimethyl formamide.

Example IV

Chemically equivalent amounts of freshly distilled 2,2,3,3,4,4,5,5, octafluoro-1,6-hexanediamine and diethyladipate were heated in a sealed glass vessel at 125–130° for 24 hours. The vessel was opened and heating continued for one hour at 80–100° to remove the by-product alcohol. The polyamide occurred as a wax-like, slightly colored mass which was insoluble in most of the common organic solvents but soluble in hot dimethyl formamide.

Example V

Two parts (by weight) of 2,2,3,3,4,4,5,5, octafluoro-1,6-hexanediamine and one part (by weight) of adipyl chloride were mixed together in a dry glass vessel which was sealed immediately after the mixing and heated at a temperature of 80–100° for five hours. Polymeric octafluorohexamethylene adipamide was obtained in the form of a white mass. The mass was washed successively with hot alcohol, dilute hydrochloric acid, water, alcohol and ether. It had a melting range of 215–220°, was soluble in hot dimethyl formamide, and insoluble in most of the common organic solvents.

Instead of the diethyl ester of the dicarboxylic acid, other diesters may be employed in the reaction. Thus, in the formula

ROOC(CX′₂)ₙCOOR as given herein, R may be a lower alkyl or lower alkenyl radical containing from one to eight carbons, inclusive, may comprise a straight or branched chain structure. In the formula, R may be, for example, in addition to the ethyl radical specifically illustrated, methyl, propyl, isopropyl, allyl, butyl, butenyl, isobutyl, amyl, pentenyl, hexyl, hexenyl, etc. Mixed esters may also be employed. Instead of hexamethylene diamine or octafluoro-1,6-hexanediamine, other di- 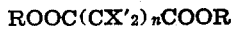 amines or fluorinated diamines in which all of the carbon atoms except the terminal carbons vicinal to the nitrogen atoms are attached exclusively with carbon and fluorine atoms and the terminal carbons are attached exclusively to carbon, hydrogen, and nitrogen atoms, may be employed, including ethylene diamine, propylene diamine, 1,4-butane diamine, pentamethylene diamine, difluoro-1,3-propane diamine, tetrafluoro-1,4-butane diamine, and hexafluoro-1,5-pentane diamine.

Since some variations and modifications may be made in the procedures specifically exemplified, without departing from the spirit and scope of the invention, it is to be understood that the invention is not to be limited except as defined by the appended claims.

I claim:

1. A long chain linear polyamide, the repeating structural unit of which is represented by

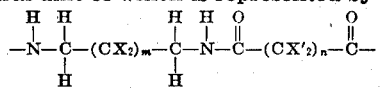

where $m$ is an integer from 0 to 4 inclusive, $X'$ is selected from the group consisting of hydrogen and fluorine, and $n$ is an integer from 1 to 5 inclusive, $X'$ being fluorine when $m$ is zero, and when $m$ is other than zero, $X$ and $X'$ being selected from the group consisting of hydrogen and fluorine, at least one of the symbols $X$ and $X'$ being fluorine.

2. A long chain linear polyamide, the repeating structural unit of which is represented by

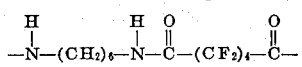

3. A long chain linear polyamide, the repeating structural unit of which is represented by

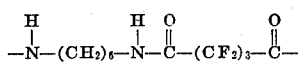

4. A long chain linear polyamide, the repeating structural unit of which is represented by

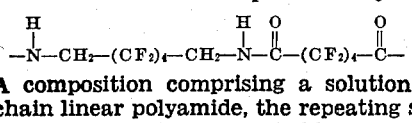

5. A composition comprising a solution of a long chain linear polyamide, the repeating structural unit of which is represented by

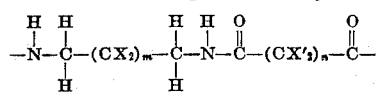

where $m$ is an integer from 0 to 4 inclusive, $X'$ is selected from the group consisting of hydrogen and fluorine, and $n$ is an integer from 1 to 5 inclusive, $X'$ being fluorine when $m$ is zero, and when $m$ is other than zero, $X$ and $X'$ being selected from the group consisting of hydrogen and fluorine, at least one of the symbols $X$ and $X'$ being fluorine, in dimethylformamide.

6. A composition comprising a solution of a long chain linear polyamide, the repeating structural unit of which is represented by

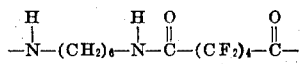

in dimethylformamide.

7. A composition comprising a solution of a long chain linear polyamide, the repeating structural unit of which is represented by

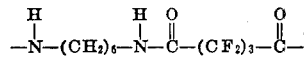

in dimethylformamide.

8. A synthetic fiber comprising a long chain linear polyamide, the repeating structural unit of which is represented by

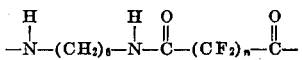

where $n$ is an integer from one to five inclusive.

9. A synthetic fiber comprising a long chain linear polyamide, the repeating structural unit of which is represented by

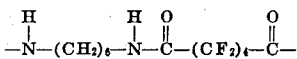

10. A synthetic fiber comprising a long chain linear polyamide, the repeating structural unit of which is represented by

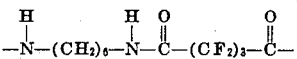

11. A process for the production of fluorinated polyamides which comprises heating a mixture of hexamethylene diamine and a dicarboxylic acid derivative of the formula

where Y is selected from the group consisting of COCl and COOR, R being a substituent taken from the group consisting of alkyl and alkenyl radicals containing from one to eight carbon atoms, and $n$ is an integer from one to five inclusive, until a polyamide having a molecular weight of less than 10,000 is formed, removing at least the major portion of any by-products formed in the reaction, and thereafter heating the polyamide at elevated temperature until a polyamide is formed which is capable of being drawn into continuous filaments.

12. A method of making fluorine-containing polyamides which comprises heating a mixture of hexamethylene diamine and diethyl octafluoroadipate until a polyamide having a molecular weight of less than 10,000 is formed, removing at least the major portion of the alcohol formed as by-product in the reaction, and thereafter heating the polyamide at elevated temperature until a polyamide is obtained which is capable of being drawn into continuous filaments.

13. A method of making fluorine-containing polyamides which comprises heating a mixture of hexamethylene diamine and diethyl hexafluoroglutarate until a polyamide having a molecular weight of less than 10,000 is formed, removing at least the major portion of the alcohol formed as by-product in the reaction, and thereafter heating the polyamide at elevated temperatures until a polyamide is obtained which is capable of being drawn into continuous filaments.

ARTHUR L. ALLEWELT.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,130,948 | Carothers | Sept. 20, 1938 |
| 2,426,224 | Kharasch | Aug. 26, 1947 |
| 2,453,146 | McBee et al. | Nov. 9, 1948 |
| 2,453,147 | McBee et al. | Nov. 9, 1948 |